US011937629B2

(12) United States Patent
Thorsen

(10) Patent No.: US 11,937,629 B2
(45) Date of Patent: Mar. 26, 2024

(54) APPARATUS FOR HEATING SMOKABLE MATERIAL

(71) Applicant: NICOVENTURES TRADING LIMITED, London (GB)

(72) Inventor: Mitchel Thorsen, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 526 days.

(21) Appl. No.: 16/099,323

(22) PCT Filed: May 12, 2017

(86) PCT No.: PCT/EP2017/061519
§ 371 (c)(1),
(2) Date: Nov. 6, 2018

(87) PCT Pub. No.: WO2017/194763
PCT Pub. Date: Nov. 16, 2017

(65) Prior Publication Data

US 2019/0208816 A1 Jul. 11, 2019

Related U.S. Application Data

(60) Provisional application No. 62/336,296, filed on May 13, 2016.

(51) Int. Cl.
*A24F 1/02* (2006.01)
*A24F 40/00* (2020.01)
(Continued)

(52) U.S. Cl.
CPC ................ *A24F 1/02* (2013.01); *A24F 40/00* (2020.01); *A24F 40/10* (2020.01); *A24F 40/46* (2020.01);
(Continued)

(58) Field of Classification Search
CPC ......... A24F 40/10; A24F 40/46; A24F 40/485
See application file for complete search history.

(56) References Cited

U.S. PATENT DOCUMENTS 174,884 A 3/1876 Wolff
239,198 A 3/1881 Simonds
(Continued)

FOREIGN PATENT DOCUMENTS

AU 2016282378 A1 1/2018
AU 2018246327 B2 6/2021
(Continued)

OTHER PUBLICATIONS

International Search Report and Written Opinion, Application No. PCT/EP2017/061519, dated Dec. 15, 2017, 22 pages.
(Continued)

*Primary Examiner* — Michael H. Wilson
*Assistant Examiner* — Jennifer A Kessie
(74) *Attorney, Agent, or Firm* — Husch Blackwell LLP

(57) ABSTRACT

An apparatus arranged to heat smokable material to volatilize at least one component of the smokable material. The apparatus includes a housing, the housing having a first opening at a first end through which a consumable article containing smokable material can be removably inserted into the apparatus; at least one heater arrangement arranged within the housing for heating smokable material within the consumable article when in use and a hollow chamber between the first opening and the at least one heater arrangement. The hollow chamber surrounds at least a portion of the consumable article when the consumable article is inserted into the device and an inner wall of the chamber and the at least a portion of the consumable article define an air gap there between. Hot vapors that escape the consumable article in use can condense on the inner wall of the hollow chamber.

21 Claims, 8 Drawing Sheets

(51) Int. Cl.

| | |
|---|---|
| ***A24F 40/10*** | (2020.01) |
| ***A24F 40/20*** | (2020.01) |
| ***A24F 40/46*** | (2020.01) |
| ***A24F 40/485*** | (2020.01) |
| ***H05B 3/06*** | (2006.01) |
| ***H05B 3/14*** | (2006.01) |
| ***H05B 3/46*** | (2006.01) |

(52) U.S. Cl.

CPC ............. *A24F 40/485* (2020.01); *H05B 3/06* (2013.01); *H05B 3/146* (2013.01); *H05B 3/46* (2013.01); *A24F 40/20* (2020.01)

(56) References Cited

U.S. PATENT DOCUMENTS

| | | | | |
|---|---|---|---|---|
| 239,776 | A | 4/1881 | Henley | |
| D22,270 | S | 3/1893 | Marshall | |
| D27,458 | S | 8/1897 | Alexander | |
| 1,927,956 | A | 9/1933 | Samuel et al. | |
| 2,371,557 | A | 3/1945 | Sullivan | |
| D164,391 | S | 8/1951 | Wagner | |
| D239,631 | S | 4/1976 | Lauri | |
| D239,776 | S | 5/1976 | Kenjiro | |
| 4,214,658 | A | 7/1980 | Crow | |
| 4,226,250 | A | 10/1980 | Ehrenpreis et al. | |
| D284,506 | S | 7/1986 | Gutknecht | |
| D301,837 | S | 6/1989 | Peterson et al. | |
| D303,766 | S | 10/1989 | Delbanco | |
| 5,144,962 | A | 9/1992 | Counts et al. | |
| D360,281 | S | 7/1995 | Kim | |
| 5,564,442 | A | 10/1996 | MacDonald et al. | |
| 5,665,262 | A | 9/1997 | Hajaligol et al. | |
| 5,692,291 | A * | 12/1997 | Deevi ...................... | H05B 3/42 29/611 |
| 5,708,258 | A | 1/1998 | Counts et al. | |
| 5,878,752 | A | 3/1999 | Adams et al. | |
| 5,954,979 | A * | 9/1999 | Counts .................. | A24F 47/008 219/260 |
| D422,113 | S | 3/2000 | Higgins et al. | |
| D424,236 | S | 5/2000 | Reed | |
| 6,158,530 | A | 12/2000 | Bowen et al. | |
| D437,112 | S | 2/2001 | Toffoli | |
| D446,849 | S | 8/2001 | Weinberg | |
| D506,001 | S | 6/2005 | Christianson | |
| D512,493 | S | 12/2005 | Haranaka | |
| D538,222 | S | 3/2007 | Curello et al. | |
| D558,060 | S | 12/2007 | Šir | |
| D558,330 | S | 12/2007 | Chang | |
| D576,718 | S | 9/2008 | Nomi et al. | |
| D634,417 | S | 3/2011 | Abbondanzio et al. | |
| D634,832 | S | 3/2011 | Abbondanzio et al. | |
| D643,732 | S | 8/2011 | Cummings et al. | |
| 7,988,660 | B2 | 8/2011 | Byland et al. | |
| D645,757 | S | 9/2011 | Milhem et al. | |
| D648,340 | S | 11/2011 | Okura | |
| D650,472 | S | 12/2011 | Petersen | |
| D654,160 | S | 2/2012 | Yomtov | |
| D657,857 | S | 4/2012 | Choi | |
| D663,891 | S | 7/2012 | Cohen Harel | |
| D664,709 | S | 7/2012 | Almsberger et al. | |
| D665,734 | S | 8/2012 | Fitch et al. | |
| D674,479 | S | 1/2013 | Merchant et al. | |
| D677,623 | S | 3/2013 | Fitch et al. | |
| D677,774 | S | 3/2013 | Postma | |
| 8,528,780 | B2 | 9/2013 | Houghton et al. | |
| D695,396 | S | 12/2013 | Tani et al. | |
| D696,815 | S | 12/2013 | Abroff | |
| D700,397 | S | 2/2014 | Manca et al. | |
| D704,319 | S | 5/2014 | Cai | |
| D708,129 | S | 7/2014 | Houghton et al. | |
| D708,727 | S | 7/2014 | Postma | |
| D714,647 | S | 10/2014 | Kersten | |
| D715,760 | S | 10/2014 | Kim et al. | |
| D716,267 | S | 10/2014 | Kim et al. | |
| D728,855 | S | 5/2015 | Liu | |
| D729,440 | S | 5/2015 | Liu | |
| D729,445 | S | 5/2015 | Leidel | |
| D732,023 | S | 6/2015 | Asao | |
| D736,455 | S | 8/2015 | Liu | |
| D740,673 | S | 10/2015 | Corradini et al. | |
| D743,099 | S | 11/2015 | Oglesby | |
| D743,889 | S | 11/2015 | Lyles et al. | |
| D745,404 | S | 12/2015 | Julier et al. | |
| D746,771 | S | 1/2016 | Perez | |
| D758,656 | S | 6/2016 | Freshwater et al. | |
| D759,296 | S | 6/2016 | Abroff et al. | |
| D760,414 | S | 6/2016 | Brown et al. | |
| D768,834 | S | 10/2016 | Schuller et al. | |
| D771,867 | S | 11/2016 | Leidel et al. | |
| D773,114 | S | 11/2016 | Leidel et al. | |
| 9,499,332 | B2 | 11/2016 | Fernando et al. | |
| D775,762 | S | 1/2017 | Chen | |
| D778,831 | S | 2/2017 | Chen | |
| D787,657 | S | 5/2017 | Farone et al. | |
| D787,728 | S | 5/2017 | Wing et al. | |
| D788,364 | S | 5/2017 | Chen | |
| D807,575 | S | 1/2018 | Luo | |
| D818,637 | S | 5/2018 | Ringel | |
| D819,023 | S | 5/2018 | Shim | |
| D821,640 | S | 6/2018 | Qiu | |
| D828,295 | S | 9/2018 | Li | |
| D828,622 | S | 9/2018 | Chen et al. | |
| D828,912 | S | 9/2018 | Powell et al. | |
| D828,950 | S | 9/2018 | Gu | |
| D828,953 | S | 9/2018 | Chen | |
| D833,384 | S | 11/2018 | Takayanagi | |
| 10,136,679 | B1 | 11/2018 | Shotey et al. | |
| D835,857 | S | 12/2018 | Benacquisto et al. | |
| D839,823 | S | 2/2019 | Lemelson et al. | |
| 10,194,697 | B2 | 2/2019 | Fernando et al. | |
| D842,237 | S | 3/2019 | Qiu et al. | |
| D842,243 | S | 3/2019 | Qiu | |
| D843,052 | S | 3/2019 | Powell et al. | |
| D844,030 | S | 3/2019 | You | |
| D848,603 | S | 5/2019 | Fujino et al. | |
| D853,022 | S | 7/2019 | Srour | |
| D854,236 | S | 7/2019 | Qiu | |
| D861,549 | S | 10/2019 | Lai | |
| D869,086 | S | 12/2019 | Pan | |
| D870,367 | S | 12/2019 | Chung et al. | |
| D872,355 | S | 1/2020 | Powell et al. | |
| D876,214 | S | 2/2020 | Yu | |
| D881,458 | S | 4/2020 | Ouyang | |
| D883,197 | S | 5/2020 | Doucet | |
| D883,563 | S | 5/2020 | Pan | |
| D884,266 | S | 5/2020 | Wang | |
| D884,961 | S | 5/2020 | He | |
| D885,332 | S | 5/2020 | Han | |
| D885,337 | S | 5/2020 | Xu | |
| D885,651 | S | 5/2020 | Miyamoto | |
| D888,326 | S | 6/2020 | Qiu | |
| D888,329 | S | 6/2020 | Qiu | |
| D889,740 | S | 7/2020 | Beer et al. | |
| D891,692 | S | 7/2020 | Barbaric et al. | |
| D892,124 | S | 8/2020 | Shim | |
| D893,009 | S | 8/2020 | Choi | |
| D894,476 | S | 8/2020 | Miyamoto | |
| D896,519 | S | 9/2020 | Cooper et al. | |
| D897,596 | S | 9/2020 | Huang et al. | |
| D898,280 | S | 10/2020 | Li et al. | |
| D898,990 | S | 10/2020 | Liu et al. | |
| D898,991 | S | 10/2020 | Pan | |
| 10,791,765 | B2 | 10/2020 | Li et al. | |
| D901,072 | S | 11/2020 | Goradesky | |
| D904,401 | S | 12/2020 | Wu | |
| D904,678 | S | 12/2020 | Wang et al. | |
| D905,901 | S | 12/2020 | Kim et al. | |
| D908,344 | S | 1/2021 | Jones | |
| D908,834 | S | 1/2021 | Cho et al. | |
| D908,952 | S | 1/2021 | Guo | |
| 11,134,717 | B2 | 10/2021 | Naughton et al. | |
| 2004/0025865 | A1 | 2/2004 | Nichols et al. | |
| 2005/0199610 | A1 | 9/2005 | Ptasienski et al. | |

(56) References Cited

U.S. PATENT DOCUMENTS

2007/0074734 A1 4/2007 Braunshteyn et al.
2007/0283972 A1 12/2007 Monsees et al.
2008/0149118 A1 6/2008 Oglesby et al.
2009/0114737 A1 5/2009 Yu et al.
2009/0145448 A1 6/2009 Worlock et al.
2010/0218778 A1* 9/2010 Borden .................... A24F 1/02 131/194
2010/0236561 A1 9/2010 Barnes et al.
2010/0275779 A1 11/2010 Melikyan
2011/0108025 A1 5/2011 Fink et al.
2011/0240047 A1 10/2011 Adamic
2011/0290244 A1 12/2011 Schennum
2013/0042865 A1 2/2013 Monsees et al.
2014/0060554 A1 3/2014 Collett et al.
2014/0069444 A1 3/2014 Cyphert et al.
2014/0196718 A1 7/2014 Li et al.
2014/0338680 A1* 11/2014 Abramov ............. A24F 47/008 131/328
2014/0366898 A1 12/2014 Monsees et al.
2015/0053217 A1 2/2015 Steingraber et al.
2015/0059787 A1 3/2015 Qiu
2015/0101606 A1 4/2015 White
2015/0101944 A1 4/2015 Li et al.
2015/0181934 A1 7/2015 Lyubomirskiy et al.
2015/0181937 A1 7/2015 Dubief et al.
2015/0189919 A1 7/2015 Liu
2015/0245658 A1 9/2015 Worm et al.
2015/0257447 A1 9/2015 Sullivan
2016/0007652 A1 1/2016 Taluskie et al.
2016/0081395 A1 3/2016 Thorens et al.
2016/0255879 A1* 9/2016 Paprocki ............... A24F 40/485
2017/0231276 A1 8/2017 Mironov et al.
2017/0232211 A1 8/2017 Gallem et al.
2018/0168224 A1 6/2018 Naughton et al.
2018/0271151 A1 9/2018 Litten
2019/0029326 A1 1/2019 Qiu
2019/0046745 A1 2/2019 Nettenstrom et al.
2019/0150508 A1 5/2019 Thorsen et al.
2019/0166918 A1 6/2019 Thorsen et al.
2019/0200678 A1 7/2019 Thorson et al.
2019/0208815 A1 7/2019 Thorsen
2019/0208816 A1 7/2019 Thorsen
2019/0208817 A1 7/2019 Qiu et al.
2019/0246693 A1 8/2019 Nettenstrom et al.
2019/0387799 A1 12/2019 Reevell
2020/0187555 A1 6/2020 Lee
2020/0245681 A1 8/2020 An
2020/0253280 A1 8/2020 Thorsen
2020/0345075 A1 11/2020 Hepworth
2020/0345960 A1 11/2020 Begin et al.
2020/0359706 A1 11/2020 Liu
2021/0000169 A1 1/2021 Hepworth
2021/0007401 A1 1/2021 Moloney et al.

FOREIGN PATENT DOCUMENTS

CN 1122213 A 5/1996
CN 1126425 A 7/1996
CN 1190335 A 8/1998
CN 1333657 A 1/2002
CN 1633247 A 6/2005
CN 1947462 A 4/2007
CN 101044795 A 9/2007
CN 102595943 A 7/2012
CN 102753047 A 10/2012
CN 202819632 U 3/2013
CN 103763953 A 4/2014
CN 103763954 A 4/2014
CN 103919279 A 7/2014
CN 103974639 A 8/2014
CN 104256898 A 1/2015
CN 104394721 A 3/2015
CN 104768407 A 7/2015
CN 104770894 A 7/2015
CN 105361249 A 3/2016
CN 205052881 U 3/2016
CN 304659647 6/2018
CN 304659654 6/2018
CN 304691359 6/2018
CN 304696494 6/2018
CN 304724787 7/2018
CN 304840668 10/2018
CN 304854337 10/2018
CN 304935891 12/2018
CN 305060127 3/2019
CN 305162683 5/2019
CN 305475358 12/2019
DE 19854005 A1 5/2000
DE 19854009 A1 5/2000
EM 0026114260001 3/2015
EM 0027270990001 9/2017
EM 0027270990007 9/2017
EM 0029810430001 5/2018
EP 2316286 A1 5/2011
EP 2340729 A1 7/2011
EP 2797448 A2 11/2014
EP 3954238 A2 2/2022
GB 191000639 A 12/1910
JP S59161 U 1/1984
JP H03108472 A 5/1991
JP H03232481 A 10/1991
JP 05090161 U 12/1993
JP H0590161 U 12/1993
JP 2001521123 A 11/2001
JP 3392138 B2 3/2003
JP 2003527127 A 9/2003
JP 2005510968 A 4/2005
JP 2006223158 A 8/2006
JP 2009509521 A 3/2009
JP 2013509160 A 3/2013
JP 5510968 B2 6/2014
JP 2014520542 A 8/2014
JP 2014524313 A 9/2014
JP 2014525251 A 9/2014
JP 2014533513 A 12/2014
JP 2015519915 A 7/2015
JP 2015521847 A 8/2015
JP 2016534730 A 11/2016
JP 6539756 B2 7/2019
JP 6737902 B2 8/2020
JP 6764505 B2 9/2020
KR 0178388 B1 2/1999
KR 20010089445 A 10/2001
KR 100304044 B1 11/2001
KR 100404704 B1 10/2004
KR 100495099 B1 11/2005
KR 20070108215 A 11/2007
KR 20100035492 A 4/2010
KR 20110115143 A 10/2011
KR 102233850 B1 3/2021
RU 76781 U1 10/2008
RU 2351131 C2 4/2009
RU 2600092 C2 10/2016
WO WO-9219081 A1 10/1992
WO WO 9406314 3/1994
WO WO-9527412 A1 10/1995
WO WO-9741744 A1 11/1997
WO WO-9748295 A1 12/1997
WO WO 9920939 4/1999
WO WO-0027232 A1 5/2000
WO WO-0170054 A1 9/2001
WO WO-03056948 A1 7/2003
WO WO-2007039794 A2 4/2007
WO WO-2010047389 A1 4/2010
WO WO-2011118024 A1 9/2011
WO WO-2013025921 A1 2/2013
WO WO 2013034460 3/2013
WO 2013055194 A2 4/2013
WO WO-2013076098 A2 5/2013
WO WO-2013098396 A2 7/2013
WO WO-2013098397 A2 7/2013
WO WO-2013160112 A2 10/2013
WO WO-2014047954 A1 4/2014

(56) References Cited

FOREIGN PATENT DOCUMENTS

| | | |
|---|---|---|
| WO | WO 2015062983 | 5/2015 |
| WO | WO-2015091258 A1 | 6/2015 |
| WO | WO-2015166245 A2 | 11/2015 |
| WO | WO-2016012774 A1 | 1/2016 |
| WO | WO-2016207407 A1 | 12/2016 |
| WO | WO-2017194762 A1 | 11/2017 |
| WO | WO-2017194763 A2 | 11/2017 |
| WO | WO-2017194764 A1 | 11/2017 |
| WO | WO-2017194766 A1 | 11/2017 |
| WO | WO-2017194769 A1 | 11/2017 |
| WO | WO-2018019786 A1 | 2/2018 |
| WO | WO-D200284-003 | 8/2020 |

OTHER PUBLICATIONS

International Preliminary Report on Patentability, Application No. PCT/EP2017/061519, dated Jul. 25, 2018, 22 pages.

Notice of Reasons for Rejection for Japanese Application No. 2020-121968, dated Jun. 15, 2021, 8 pages.

Office Action dated Jul. 22, 2020 for Chinese Application No. 2017800293080.0 filed May 12, 2017, 14 pages.

Office Action dated Jun. 17, 2020 for Korean Application No. 10-2018-7032794, 15 pages.

Office Action dated Feb. 18, 2020 for Japanese Application No. 2018-559712, 6 pages.

Second Office Action dated May 19, 2021 for Chinese Application No. 2017800293080, 18 pages.

Application and File History for U.S. Appl. No. 29/676,726, filed Jan. 14, 2019, 98 pages, inventor(s): Powell et al.

Application and File History for U.S. Appl. No. 16/099,315, filed Nov. 6, 2018, Inventor: Thorsen, 222 pages.

Application and Filing Receipt for U.S. Appl. No. 29/557,914, filed Mar. 14, 2016, 280 pages, inventor(s): Powell et al.

Decision to Grant dated Jan. 18, 2017 for Russian Application No. 2016503074, 4 pages.

English Translation of Office Action dated Dec. 25, 2018 for Korean Application No. 10-2017-7037332, 7 pages.

"Glo E-cigarette", published 2016, retrieved from https://ifworlddesignguide.com/entry/235574-glo on May 12, 2020, 4 pages.

"Handbook of Advanced Robotics", [US] E. L. Safford, Translated by LI, Deming et al., Shanghai Translation Publishing Company, Mar. 1987, 1st edition, pp. 162-163.

U.S. Appl. No. 29/687,461, filed Apr. 12, 2019, 185 pages, inventor(s): Powell et al.

U.S. Appl. No. 29/687,464, filed Apr. 12, 2019, 176 pages, inventor(s): Powell et al.

U.S. Appl. No. 29/687,469, filed Apr. 12, 2019, 147 pages, inventor(s): Powell et al.

U.S. Appl. No. 29/687,471, filed Apr. 12, 2019, 222 pages, inventor(s): Powell et al.

U.S. Appl. No. 29/705,487, filed Sep. 12, 2019 inventor(s): Powell et al., 162 pages.

U.S. Appl. No. 15/737,673, filed Dec. 18, 2017, inventor(s): Thorsen et al., 205 pages.

International Preliminary Report on Patentability for Application No. PCT/EP2017/061518, dated Aug. 17, 2018, 16 pages.

International Preliminary Report on Patentability for Application No. PCT/EP2017/061520, dated Jul. 17, 2018, 11 pages.

International Preliminary Report on Patentability for Application No. PCT/EP2017/061526, dated Nov. 22, 2018, 10 pages.

International Preliminary Report on Patentability for Application No. PCT/EP2017/068675, dated Nov. 29, 2018, 7 pages.

International Preliminary Report on Patentability for International Application No. PCT/EP2017/061520, dated Jul. 17, 2018, 11 pages.

International Preliminary Report on Patentability for International Application No. PCT/EP2017/061523, dated Jul. 23, 2018, 14 pages.

International Preliminary Report on Patentability for Application No. PCT/EP2016/064756, dated Sep. 28, 2017, 9 pages.

International Search Report and Written Opinion for Application No. PCT/EP2017/061520, dated Sep. 11, 2017, 13 pages.

International Search Report and Written Opinion for Application No. PCT/EP2017/061523, dated Sep. 11, 2017, 13 pages.

International Search Report and Written Opinion for Application No. PCT/EP2017/068675, dated Nov. 9, 2017, 15 pages.

International Search Report and Written Opinion for International Application No. PCT/EP2017/061520, dated Sep. 11, 2017, 9 pages.

International Search Report for Application No. PCT/EP2016/064756, dated Oct. 5, 2016, 2 pages.

International Search Report for Application No. PCT/EP2017/061518, dated Aug. 1, 2017, 4 pages.

International Search Report for Application No. PCT/EP2017/061526, dated Aug. 2, 2017, 4 pages.

Notice Of Reasons for Refusal for Japanese Application No. 2020-152565 dated Jun. 29, 2021, 5 pages.

Notice of Reasons for Refusal dated Nov. 20, 2018 for Japanese Application No. 2017-567106, 6 pages.

Office Action dated Jul. 13, 2020 for Chinese Application No. 201780026927.4, 15 pages.

Office Action For Canadian Application No. 2,989,260, dated Jun. 18, 2021, 3 pages.

Office Action for Chinese Application No. 201780026927.4, dated Dec. 14, 2020, 5 pages.

Office Action For Korean Application No. 10-2019-7027490, dated Sep. 1, 2021, 12 pages.

Office Action For Russian Application No. 201811038, dated Aug. 26, 2021, 7 pages.

Office Action dated Apr. 2, 2021 for Chinese Application No. 201680037678.4, 16 pages.

Office Action dated Jan. 10, 2020 for Indian Application No. 201847042184, 5 pages.

Office Action dated Mar. 10, 2020 for Japanese Application No. 2018-555932, 10 pages.

Office Action dated Jun. 16, 2020 for Korean Application No. 10-2018-7032781, 9 pages.

Office Action dated Aug. 17, 2020 for Chinese Application No. 201780028992.0, 13 pages.

Office Action dated Feb. 25, 2020 for Japanese Application No. 2018-554526, 12 pages.

Office Action dated Oct. 27, 2020 for Japanese Application No. 2018-555932, 6 pages.

Office Action dated Jan. 28, 2020 for Japanese Application No. 2018-551932, 6 pages.

Office Action dated Jun. 28, 2019 for Russian Application No. 2018139838, 5 pages.

Office Action dated Jun. 4, 2020 for Russian Application No. 2019504647, 11 pages.

Office Action dated Jan. 6, 2020 for Chinese Application No. 201680037678.4, 10 pages.

Office Action dated Feb. 25, 2020 for Japanese Application No. 2018-554501, 12 pages.

"QOQ Honor and Smart," By H KL Reviews, dated Mar. 15, 2019. Found online [Feb. 3, 2021]. https://www.youtube.com/watch?v=velv8NX6smE (Year: 2019).

Search Report dated Dec. 25, 2019 for Chinese Application No. 201680037678.4, 2 pages.

Second office Action dated Sep. 28, 2020 for Chinese Application No. 201680037678.4, 21 pages.

Uranaka T., et al., "British American Tobacco to Test Tobacco E-cigarette in Japan," Nov. 8, 2016, Retrieved from http://www.reuters.com/article/us-brit-am-tobacco-ecigarettes-idUSKBN1330AG on Apr. 7, 2017, 4 pages.

Written Opinion for Application No. PCT/EP2016/064756, dated Oct. 5, 2016, 4 pages.

Written Opinion for Application No. PCT/EP2017/061526, dated Aug. 2, 2017, 8 pages.

Decision to Grant a Patent dated Apr. 12, 2022 for Japanese Application No. 2020-152565, 5 pages.

(56) References Cited

OTHER PUBLICATIONS

European Search Report for Application No. 21212962.1, dated Mar. 17, 2022, 6 pages.
Extended European Search Report for Application No. 21197532.1, dated Apr. 11, 2022, 8 pages.
FlowerMate Vopormax-V Portable Marijuana Vaporizer Shown at: https://www.youtube.com/watch?v=S3bAYHIf_i4, Aug. 22, 2014, 1 page.
Goboof Alfa Shown at: https://www.youtube.com/watch?v=139A9OXp-yl, Nov. 22, 2014, 1 page.
Notice of Opposition mailed Jun. 28, 2022 for European Application No. 16738688.7 (EP3313217), 20 pages.
Notice Of Reasons for Refusal for Japanese Application No. 2020-152565 dated Nov. 24, 2021, 12 pages.
Office Action for Brazilian Application No. 112017027824-3, dated Jan. 9, 2022, 6 pages.
Office action for Brazilian Application No. 112018073458-6, dated Sep. 28, 2021, 4 pages.
Office Action for Japanese Application No. 2021-200209, dated Mar. 15, 2022, 5 pages.
Office Action for Malaysian Application No. PI2018704088, dated May 31, 2022, 4 pages.
Office Action for Brazilian Application No. 112018073458-6, dated Jul. 6, 2022, 7 pages.
"Decision of Refusal received for Japanese Patent Application No. 2018-555932, dated Oct. 27, 2020", 6 pages (3 pages of English Translation and 3 pages of Official Copy).
"Decision to Grant received for Russian Patent Application No. 2016503074, dated Jan. 18, 2017", 4 pages (Official Copy Only).
"Invitation to Pay Additional Fees received for PCT Patent Application No. PCT/EP2017/061519, dated Sep. 8, 2017", 13 pages.
"Office Action and Search Report received for Chinese Patent Application No. 201680037678.4, dated Jan. 6, 2020", 10 pages (English Translation Only).

* cited by examiner

APPARATUS FOR HEATING SMOKABLE MATERIAL

TECHNICAL FIELD

The present invention relates to apparatus arranged to heat smokable material.

BACKGROUND

Articles such as cigarettes, cigars and the like burn tobacco during use to create tobacco smoke. Attempts have been made to provide alternatives to these articles, which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine.

SUMMARY

According to a first aspect of the present invention, there is provided an apparatus arranged to heat smokable material to volatilise at least one component of said smokable material, the apparatus comprising: a housing; the housing having a first opening at a first end through which a consumable article containing smokable material can be removably inserted into the apparatus; at least one heater arrangement arranged within the housing for heating smokable material within the consumable article when in use; a hollow chamber between the first opening and the at least one heater, the hollow chamber surrounding at least a portion of the consumable article when the consumable article is inserted into the device, wherein an inner wall of the chamber and the at least a portion of the consumable article define an air gap there between.

In an exemplary embodiment, the hollow chamber comprises a cooling structure on its outer surface to increase heat flow away from the hollow chamber when the apparatus is in use.

In an exemplary embodiment, the cooling structure comprises at least one cooling fin.

According to a second aspect of the present invention, there is provided an apparatus arranged to heat smokable material to volatilise at least one component of said smokable material, the apparatus comprising: a housing; the housing having a first opening at a first end through which a consumable article containing smokable material can be removably inserted into the apparatus; at least one heater arrangement arranged within the housing for heating smokable material within the consumable article when in use; a hollow chamber between the first opening and the at least one heater, the hollow chamber surrounding at least a portion of the consumable article when the consumable article is inserted into the device, the hollow chamber comprising a gripping section arranged to grip the consumable article when the consumable article is inserted in the apparatus.

BRIEF DESCRIPTION OF THE DRAWINGS

Embodiments of the invention will now be described, by way of example only, with reference to the accompanying drawings, in which.

DETAILED DESCRIPTION

Figure 1:
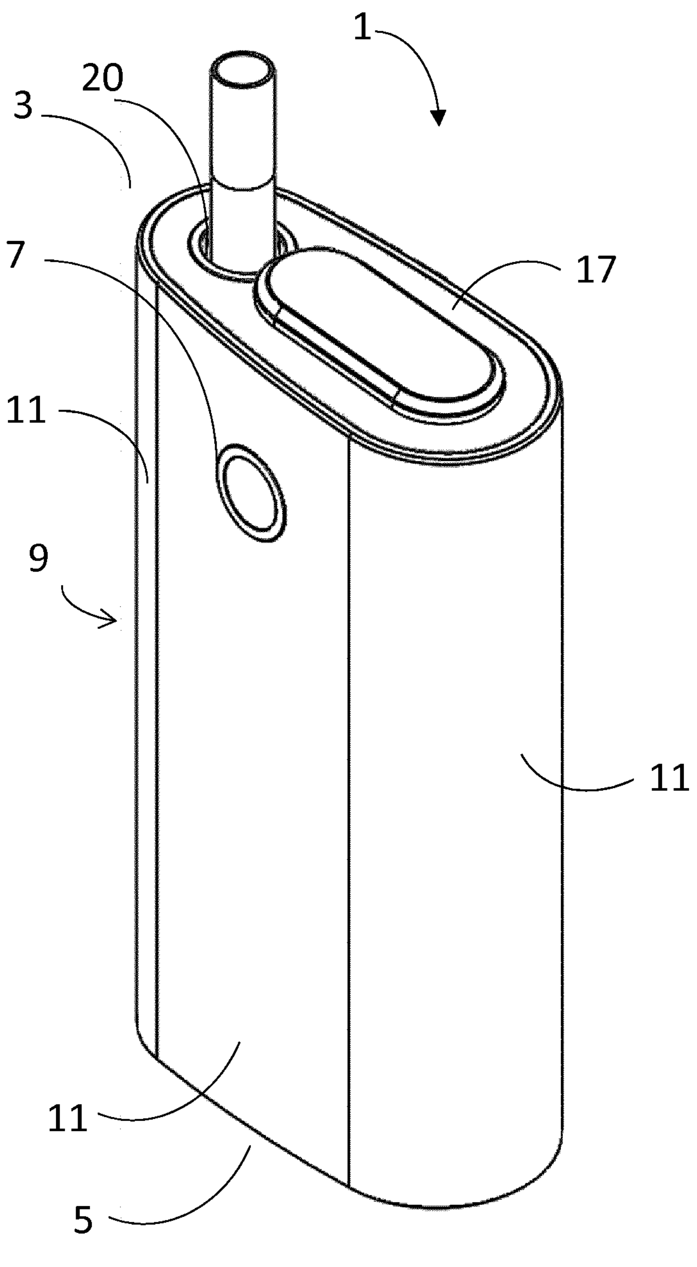
FIG. 1 shows a perspective view of an example of an apparatus for heating a smokable material.

As used herein, the term "smokable material" includes materials that provide volatilised components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be a combination or a blend of materials.

Apparatus is known that heats smokable material to volatilise at least one component of the smokable material, typically to form an aerosol which can be inhaled, without burning or combusting the smokable material. Such apparatus is sometimes described as a "heat-not-burn" apparatus or a "tobacco heating product" or "tobacco heating device" or similar. Similarly, there are also so-called e-cigarette devices, which typically vaporise a smokable material in the form of a liquid, which may or may not contain nicotine. The smokable material may be in the form of or provided as part of a rod, cartridge or cassette or the like which can be inserted into the apparatus. A heater for heating and volatilising the smokable material may be provided as a "permanent" part of the apparatus or may be provided as part of the smoking article or consumable which is discarded and replaced after use. A "smoking article" in this context is a device or article or other component that includes or contains in use the smokable material, which in use is heated to volatilise the smokable material, and optionally other components.

Referring initially to FIGS. 1 to 4, there is shown an example of an apparatus 1 arranged to heat smokable material to volatilise at least one component of said smokable material, typically to form an aerosol which can be inhaled. The apparatus 1 is a heating apparatus 1 which releases compounds by heating, but not burning, the smokable material.

A first end 3 is sometimes referred to herein as the mouth or proximal end 3 of the device 1 and a second end 5 is sometimes referred to herein as the distal end 5 of the device 1. The apparatus 1 has an on/off button 7 to allow the apparatus 1 as a whole to be switched on and off as desired by a user.

The apparatus 1 comprises a housing 9 for locating and protecting various internal components of the apparatus 1. In the example shown, the housing 9 comprises a uni-body sleeve 11 that encompasses the perimeter of the apparatus 1, capped with a top panel 17 which defines generally the 'top' of the apparatus 1 and a bottom panel 19 which defines generally the 'bottom' of the apparatus 1. In another example the housing comprises a front panel, a rear panel and a pair of opposite side panels in addition to the top panel 17 and the bottom panel 19.

The top panel 17 and/or the bottom panel 19 may be removably fixed to the uni-body sleeve 11, to permit easy access to the interior of the apparatus 1, or may be "permanently" fixed to the uni-body sleeve 11, for example to deter a user from accessing the interior of the apparatus 1. In an example, the panels 17 and 19 are made of a plastics material, including for example glass-filled nylon formed by injection moulding, and the uni-body sleeve 11 is made of aluminium, though other materials and other manufacturing processes may be used.

The top panel 17 of the apparatus 1 has an opening 20 at the mouth end 3 of the apparatus 1 through which, in use, a consumable article 21 containing smokable material may be inserted into the apparatus 1 and removed from the apparatus 1 by a user.

The housing 9 has located or fixed therein a heater arrangement 23, control circuitry 25 and a power source 27. In this example, the heater arrangement 23, the control circuitry 25 and the power source 27 are laterally adjacent (that is, adjacent when viewed from an end), with the control circuitry 25 being located generally between the heater arrangement 23 and the power source 27, though other locations are possible.

The control circuitry 25 may include a controller, such as a microprocessor arrangement, configured and arranged to control the heating of the smokable material in the consumable article 21 as discussed further below.

The power source 27 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 27 is electrically coupled to the heater arrangement 23 to supply electrical power when required and under control of the control circuitry 25 to heat the smokable material in the consumable (as discussed, to volatilise the smokable material without causing the smokable material to burn).

An advantage of locating the power source 27 laterally adjacent to the heater arrangement 23 is that a physically large power source 25 may be used without causing the apparatus 1 as a whole to be unduly lengthy. As will be understood, in general a physically large power source 25 has a higher capacity (that is, the total electrical energy that can be supplied, often measured in Amp-hours or the like) and thus the battery life for the apparatus 1 can be longer.

In one example, the heater arrangement 23 is generally in the form of a hollow cylindrical tube, having a hollow interior heating chamber 29 into which the consumable article 21 comprising the smokable material is inserted for heating in use. Different arrangements for the heater arrangement 23 are possible. For example, the heater arrangement 23 may comprise a single heating element or may be formed of plural heating elements aligned along the longitudinal axis of the heater arrangement 23. The or each heating element may be annular or tubular, or at least part-annular or part-tubular around its circumference. In an example, the or each heating element may be a thin film heater. In another example, the or each heating element may be made of a ceramics material. Examples of suitable ceramics materials include alumina and aluminium nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding.

In one particular example, the heater arrangement 23 is supported by a stainless steel support tube and comprises a polyimide heating element. The heater arrangement 23 is dimensioned so that substantially the whole of the smokable material when the consumable article 21 is inserted in the apparatus 1 so that substantially the whole of the smokable material is heated in use.

The or each heating element may be arranged so that selected zones of the smokable material can be independently heated, for example in turn (over time) or together (simultaneously) as desired.

The heater arrangement 23 in this example is surrounded along at least part of its length by a thermal insulator 31. The insulator 31 helps to reduce heat passing from the heater arrangement 23 to the exterior of the apparatus 1. This helps to keep down the power requirements for the heater arrangement 23 as it reduces heat losses generally. The insulator 31 also helps to keep the exterior of the apparatus 1 cool during operation of the heater arrangement 23. In one example, the insulator 31 may be a double-walled sleeve which provides a low pressure region between the two walls of the sleeve. That is, the insulator 31 may be for example a "vacuum" tube, i.e. a tube that has been at least partially evacuated so as to minimise heat transfer by conduction and/or convection. Other arrangements for the insulator 31 are possible, including using heat insulating materials, including for example a suitable foam-type material, in addition to or instead of a double-walled sleeve.

The housing 9 may further comprises various internal support structures 37 (best seen in FIG. 4) for supporting all internal components, as well as the heating arrangement 23.

The apparatus 1 further comprises a collar 33 which extends around and projects from the opening 20 into the interior of the housing 9 and a generally tubular chamber 35 which is located between the collar 33 and one end of the vacuum sleeve 31.

Figure 2:
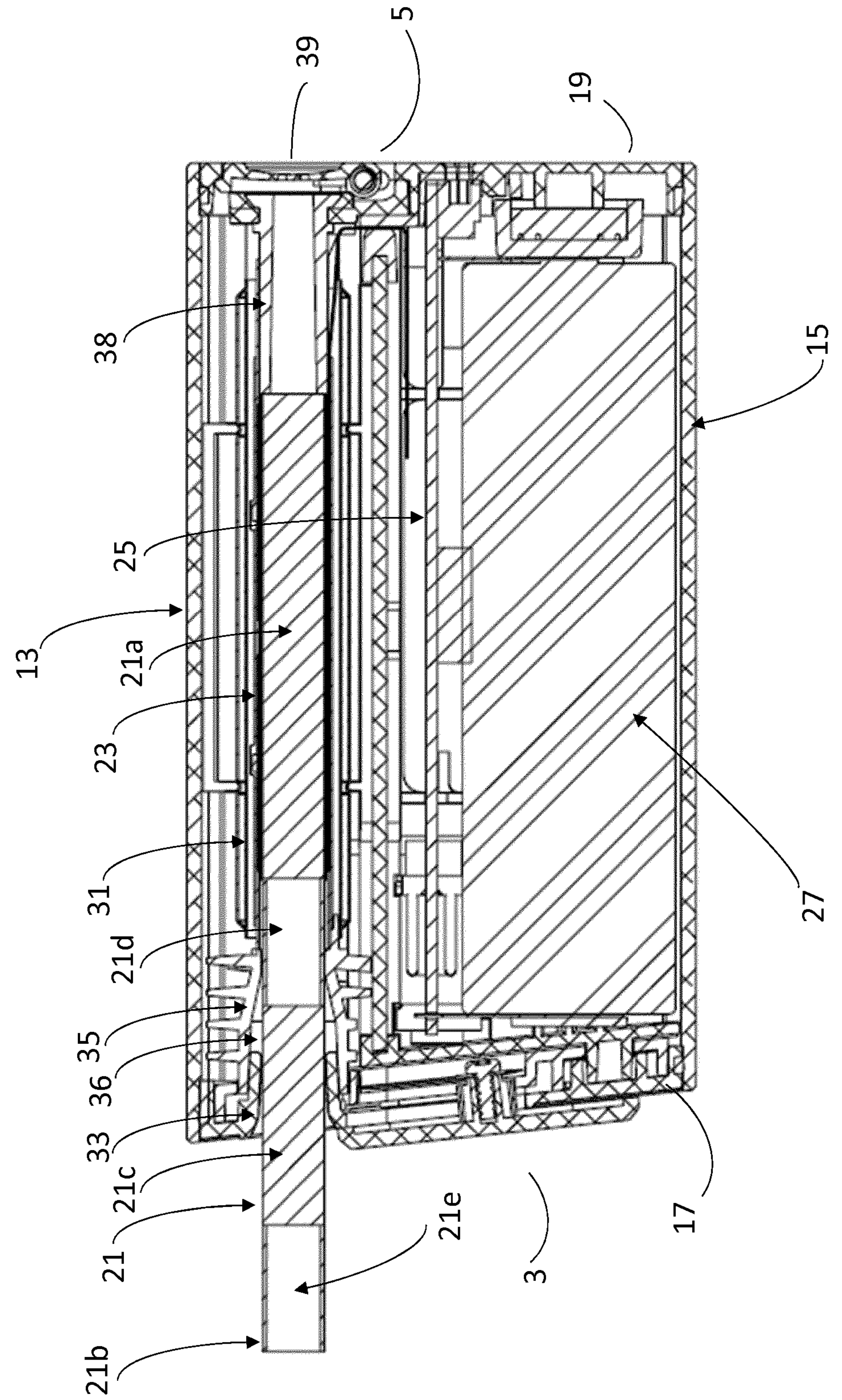
FIG. 2 shows a lateral cross-sectional view of the apparatus of FIG. 1 with a consumable article inserted.
Figure 3:
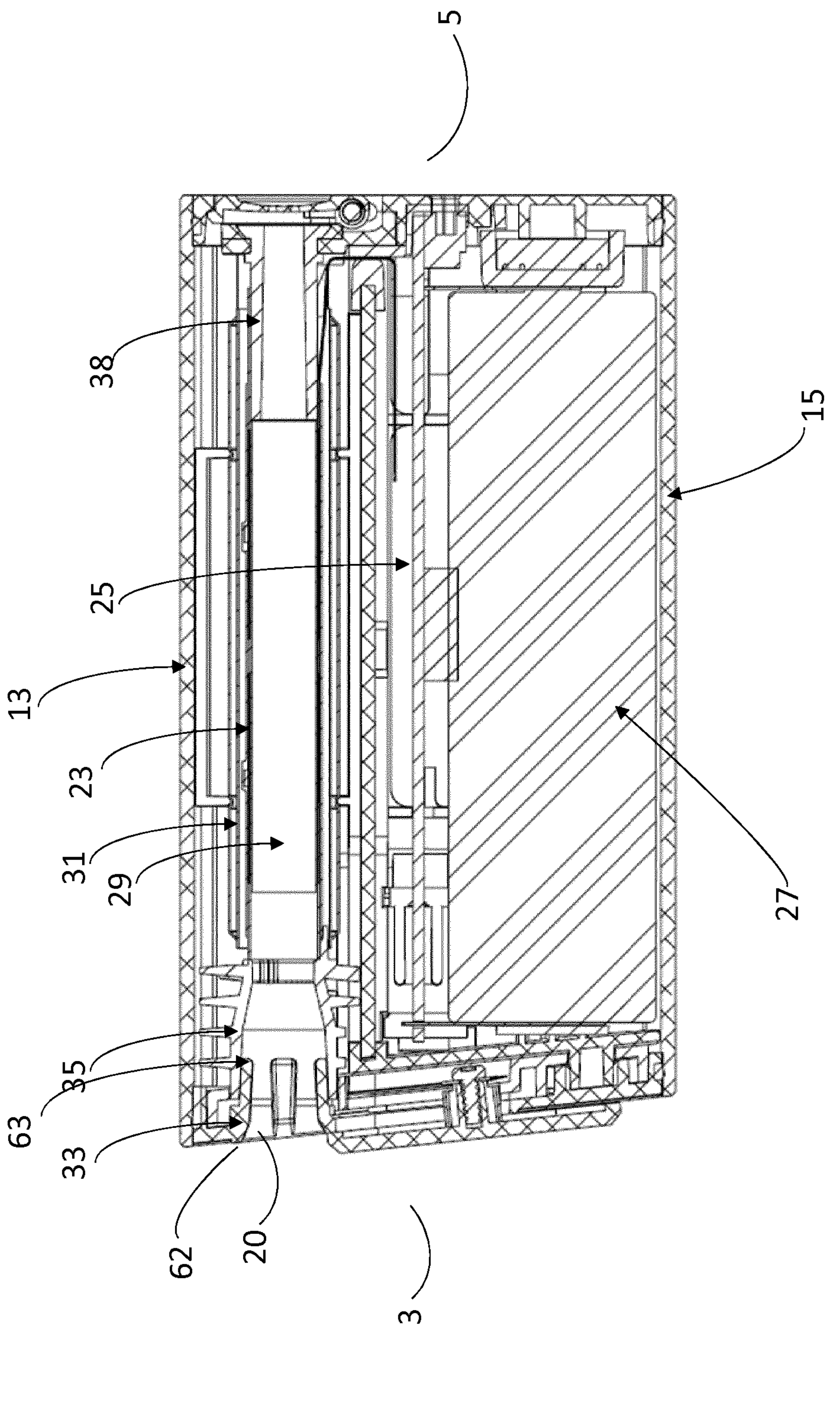
FIG. 3 shows a lateral cross-sectional view of the apparatus of FIG. 1 without a consumable article inserted.
Figure 4:
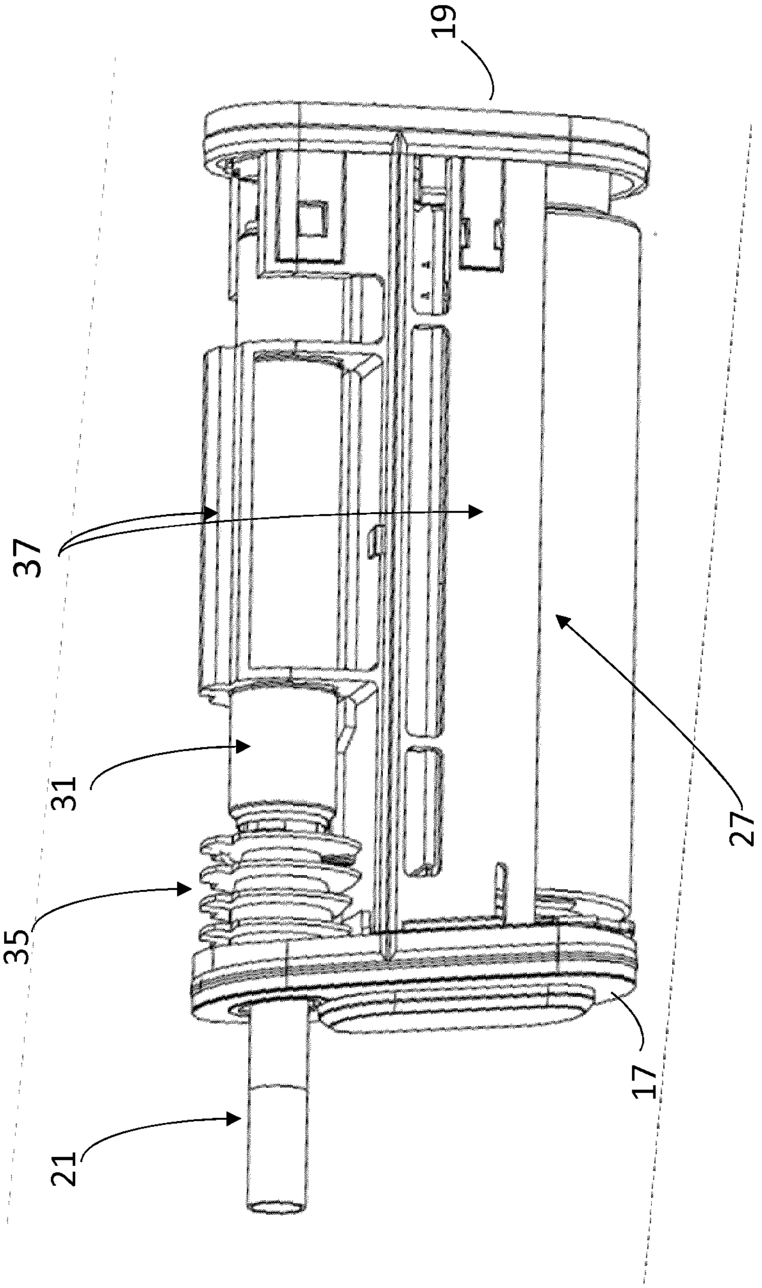
FIG. 4 shows a perspective side view of the apparatus of FIG. 1 with some external panels absent to show interior components of the apparatus.

One end of the chamber 35 connects to and is supported by the collar 33 and the other end of the chamber 35 connects to the one end of the vacuum sleeve 31 and hence supports the vacuum sleeve 31. Accordingly, as best seen in FIG. 3, the collar 33, the chamber 35 and the vacuum tube 31/heater arrangement 23 are arranged co-axially, so that, as best seen in FIG. 2, when the consumable 21 is inserted in the apparatus 1, it extends through the collar 33 and the chamber 35 into the heater chamber 29.

As mentioned above, in this example, the heater arrangement 23 is generally in the form of a hollow cylindrical tube and this tube is in fluid communication with the opening 20 at the mouth end 3 of the device 1 via the chamber 35 and the collar 33.

Referring now to FIGS. 5*a* to 5*d*, in this example, the chamber 35 comprises a tubular body 35*a* that has a first open end 35*b* and a second open end 35*c*. The tubular body 35*a* comprises a first section 35*d* that extends from the first open end 35*b* to approximately half away along the tubular body 35*a* and a second section 35*e* that extends from approximately half away along the tubular body 35*a* to the second open end 35*c*. The first section 35*d* has a substantially constant internal diameter and the second section 35*e* has an internal diameter that tapers towards the second open end 35*c*.

The chamber 35 further comprises a cooling structure 35*f*, which in this example, comprises a plurality of cooling fins 35*f* spaced apart along the body 35*a*, each of which is arranged circumferentially around the body 35*a*.

The chamber 35 also comprises a flange portion 35*g* around the second open end 35*c* and a plurality of projections or clips 35*h* also arranged around the second open end 35*c*. Each clip 35*h* is generally 'L' shaped and comprises a first portion 35*h*1 that is joined to the flange portion 35*g* and a second portion 35*h*2 that is generally perpendicular to first portion 35*h*1 and which extends in a direction generally parallel to the longitudinal axis of the tubular body 35*a*. Each second portion 35*h*2 comprises a stepped surface 35*i* that faces towards an axis that extends along the longitudinal axis of the tubular body 35*a* and which stepped surface 35*i* is slightly curved.

As best seen in FIG. 3, in this example, the chamber 35 is located in the housing 9 between the collar 33 and the vacuum tube 31/heater 23. More specifically, (i) at the second end 35*c*, the flange 35*g* butts an end portion of a polyimide tube of the heater arrangement 23 with the clips 35*h* resiliently engaging with the polyimide tube via their stepped surfaces 35*i* and the outer surfaces of the clips mating with an inside of the vacuum sleeve 31 (ii) at the first open end 35*b*, the chamber 35 connects to the collar 33 by means of ridges 60, which form part of the collar 33 and project into the chamber 35. The ridges 60 are angled from a first end 62 of the collar 33 to a second end 63 of the collar towards an axis that extends along the longitudinal axis of the collar 33 and chamber 35. The ridges lie flush with the internal surface of the chamber 35 to form a snug fit.

As is best appreciated from FIG. 2, the inner diameter of the first section 35*d* of the hollow chamber 35 is larger than the external diameter of the consumable article 2. There is therefore an air gap 36 between the hollow chamber 35 and the consumable article 21 when it is inserted in the apparatus over at least part of the length of the hollow chamber 35. The air gap 36 is around all of the circumference of the consumable article 21 in that region.

Figure 5A:
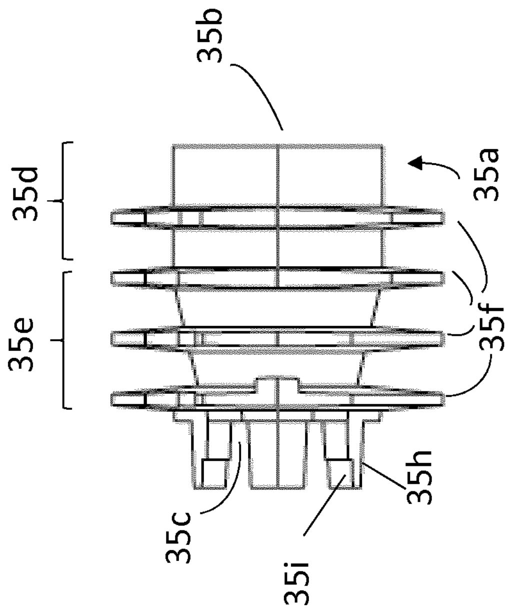
FIG. 5*a* shows a side view of an internal component of the apparatus of FIG. 1.
Figure 5B:
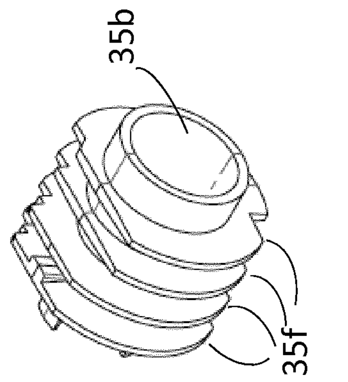
FIG. 5*b* shows a first perspective view of the internal component of the apparatus of FIG. 1.
Figure 5C:
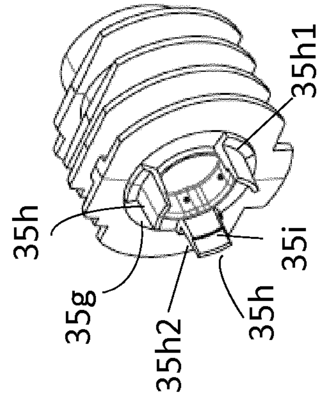
FIG. 5*c* shows a second perspective view of the internal component of the apparatus of FIG. 1.
Figure 5D:
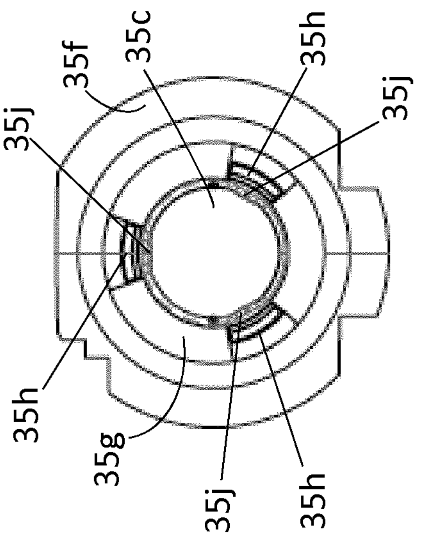
FIG. 5*d* shows an end view of the internal component of the apparatus of FIG. 1.

As best seen in FIG. 5*c* and FIG. 5*d*, at the second open end 35*c*, the chamber 35 comprises a plurality (in this example 3) of small lobes or ridges 35*j* arranged circumferentially around an inner surface of the chamber 35 at the periphery of second open end 35*c*. Each of the lobes 35*j* extends a small distance in a direction parallel to the longitudinal axis of the chamber 35 and also extends a small amount radially at the second open end 35*c*. Together, the lobes 35*j* provide a gripping section that grips the consumable article 21 in order to correctly position and retain the portion of the consumable article 21 that is within the chamber 35 when the consumable article 21 is within the apparatus 1. Between them, the lobes 35*j* gently compress or pinch the consumable article 21 in the region or regions of the consumable article that are contacted by the lobes 35*j*. The lobes 35*j* may be comprised of a resilient material (or be resilient is some other way) so that they deform slightly (for example compress) to better grip the consumable article 21 when it is inserted in the apparatus 1 but then regain their original shape when the consumable article 21 is removed from the apparatus 1. The lobes 35*j* may be formed integrally with the chamber 35 or may be separate components that are attached within the chamber 35. The inner diameter around the lobes, may be, for example, 5.377 mm.

Figure 6:
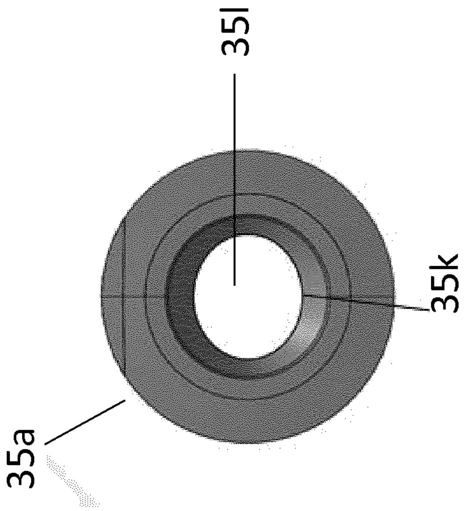
FIG. 6 shows an end view of an alternative internal component of the apparatus of FIG. 1.
Figure 7:
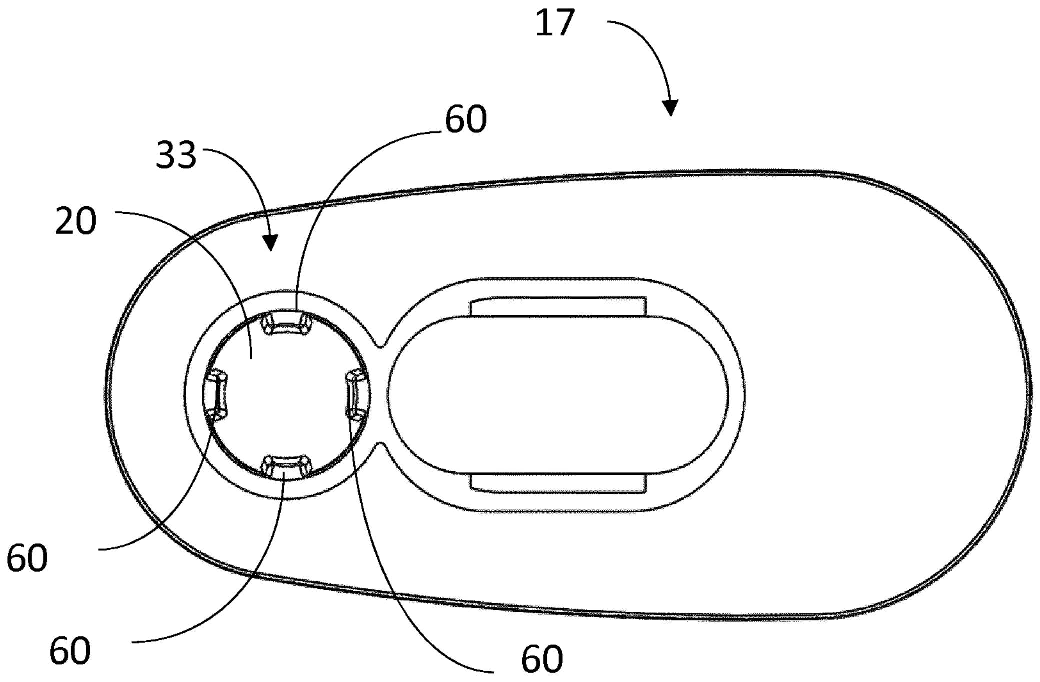
FIG. 7 shows a plan view of a top panel of the apparatus for heating a smokable material.

In an alternative example shown in FIG. 6, a resilient gripping section 35*k* within the hollow chamber 35 defines a substantially oval aperture 35*l* which, may extend along the longitudinal axis of the hollow chamber 35, and which when the consumable article 21 is inserted in the apparatus 1, gently compresses or pinches the section of the consumable article 21 that is in the oval aperture 351 so that this section of the consumable article 21 is deformed from being circular to being oval in cross section. In one example, the gripping section 35*k* is located towards the first open end 35*b*. In one example, the width of the oval section could be increased or decreased to increase or decrease the insertion/retention force. In a further example, small grooves (not shown) could be added in the surface of the oval aperture 35*l* that would interfere with the consumable article 21 rather than the entire surface area of the oval aperture 35*l*. This would minimize insertion/removal sensitivity to the transitions of the various consumable article components (tobacco, tipping paper, paper tube) passing through the gripping section 35*k*.

In a further example a combination of the lobes 35*j* and the oval gripping section 35*k* could be used to retain the consumable article 21 in the hollow chamber 35. For example, an oval gripping section 35*k* and the arrangement of lobes 35*j* could be spaced apart longitudinally in the hollow chamber 35 and act separately to retain an inserted consumable article 21 in place, or, the lobes 35*j* could be arranged around the surface of the oval gripping section 35*k*.

The chamber 35 may be formed of for example a plastics material, including for example polyether ether ketone (PEEK).

Referring again to FIGS. 2 to 4, in an example, the heating chamber 29 has a region 38 of reduced internal diameter towards the distal end 5. This region 37 provides an end stop for the consumable article 21 passed through the opening at the mouth end 3. This region 38 of reduced internal diameter, may for example, be provided by a hollow tube of the type described in detail in our co-pending application U.S. provisional patent application No. 62/185,227, filed on Jun. 26, 2015, the entire content of which is incorporated herein by reference.

The apparatus 1 may further comprise a door 39 at the distal end 5 that opens and closes an opening in the rear panel to provide access to the heating chamber 29 so that the heating chamber can be cleaned. Examples of suitable doors are also discussed in more detail in our application 62/185,227.

Referring now to FIGS. 7 to 10 in particular, there is shown an example of the top panel 17 of the apparatus 1. The top panel 17 generally forms the front end 3 of the housing 9 of the apparatus. The top panel 17 supports the collar 33 which defines an insertion point in the form of the opening 20 through which the consumable article 21 is removably inserted into the apparatus 1 in use.

The collar 33 extends around and projects from the opening 20 into the interior of the housing 9. In one example, the collar 33 is integral with the top panel 17 of the housing so the collar 33 and the top panel 17 form a single piece. In an alternative example, the collar 33 is a distinct element from the top panel 17, but can be attached to the top panel 17 through an attachment, such as a locking mechanism, adhesive, screws. Other attachments that are suitable for attaching the collar 33 to the top panel 17 may be used.

In this example, the collar 33 comprises a plurality of ridges 60 arranged circumferentially around the periphery of the opening 20 and which project into the opening 20. The ridges 60 take up space within the opening 20 such that the open span of the opening 20 at the locations of the ridges 60 is less than the open span of the opening 20 at the locations without the ridges 60. The ridges 60 are configured to engage with a consumable article 21 inserted into the apparatus to assist in securing it within the apparatus 1.

In one example, the ridges 60 are circumferentially equally spaced around the periphery of the opening 20. In one example, there are four ridges 60, in other examples there may be more or fewer than four ridges 60.

Figure 9:
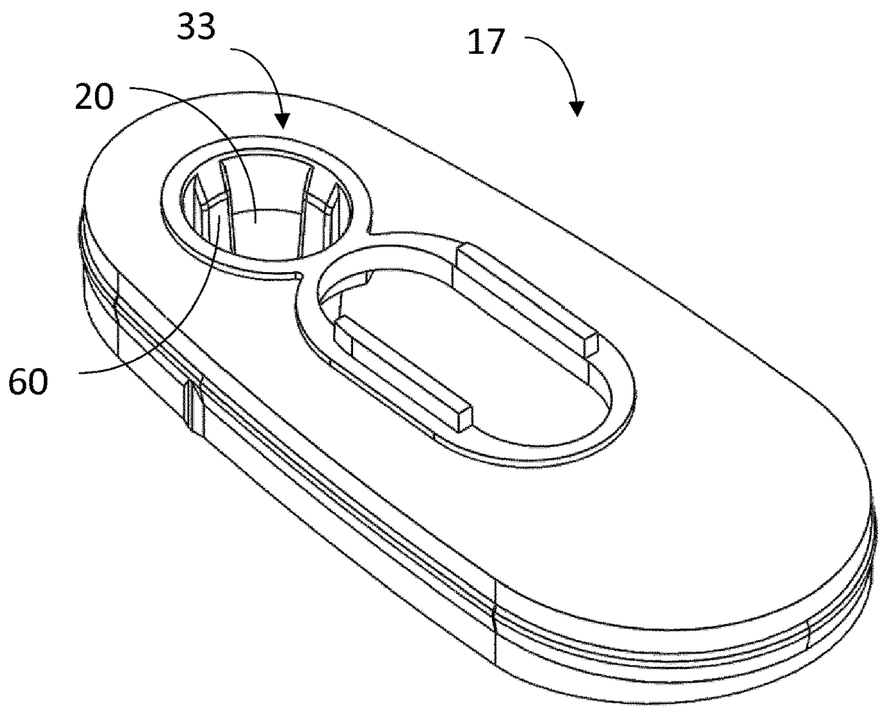
FIG. 9 shows a perspective view of a top panel of the apparatus of FIG. 7.
Figure 10:
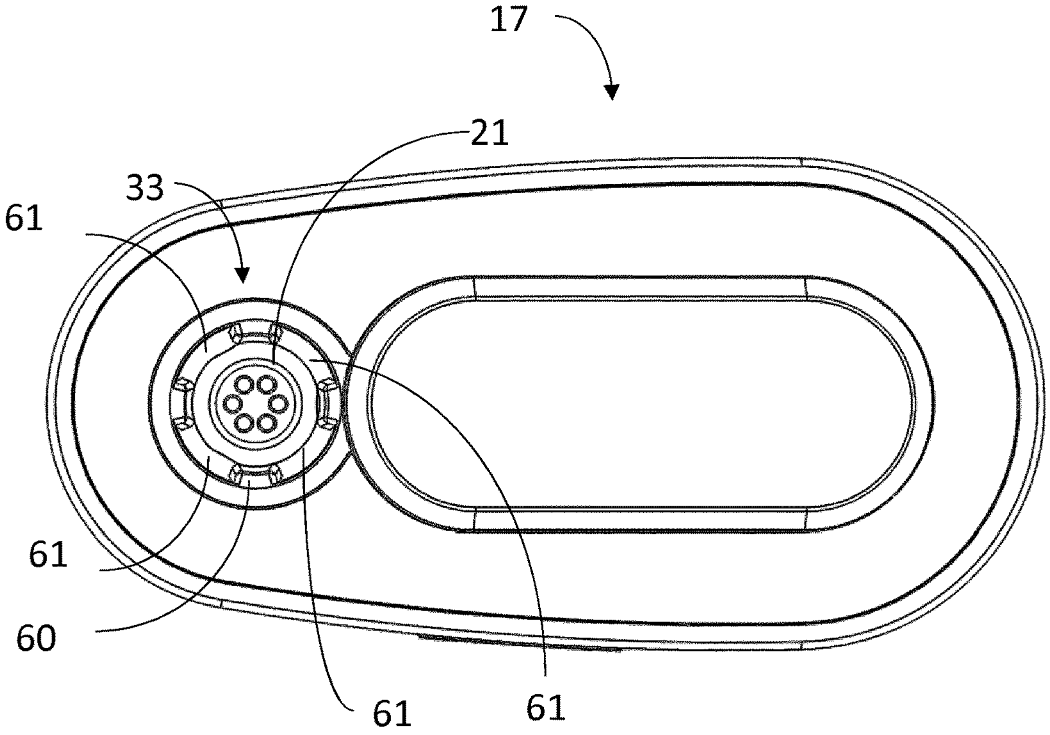
FIG. 10 shows a plan view of a top panel of the apparatus of FIG. 7 with a consumable article inserted.

FIG. 9 shows a plan view of the top panel 17 of the apparatus with a consumable article 21 inserted into the opening 20. The ridges 60 project into the opening 20 to engage with the consumable article 21. The open spaces 61 defined by adjacent pairs of ridges 60 and the consumable article 21 form ventilation paths 61 around the exterior of the consumable article 21. These ventilation paths 61, as will be explained in more detail below, allow hot vapours that have escaped from the consumable article 21 to exit the apparatus 1 and allow cooling air to flow into the apparatus 1 around the consumable 21. The example in FIG. 10 shows four ventilation paths 61 located around the periphery of the consumable article 21, which provide ventilation for the apparatus 1 although there may be more or less such ventilation paths 61.

Figure 8:
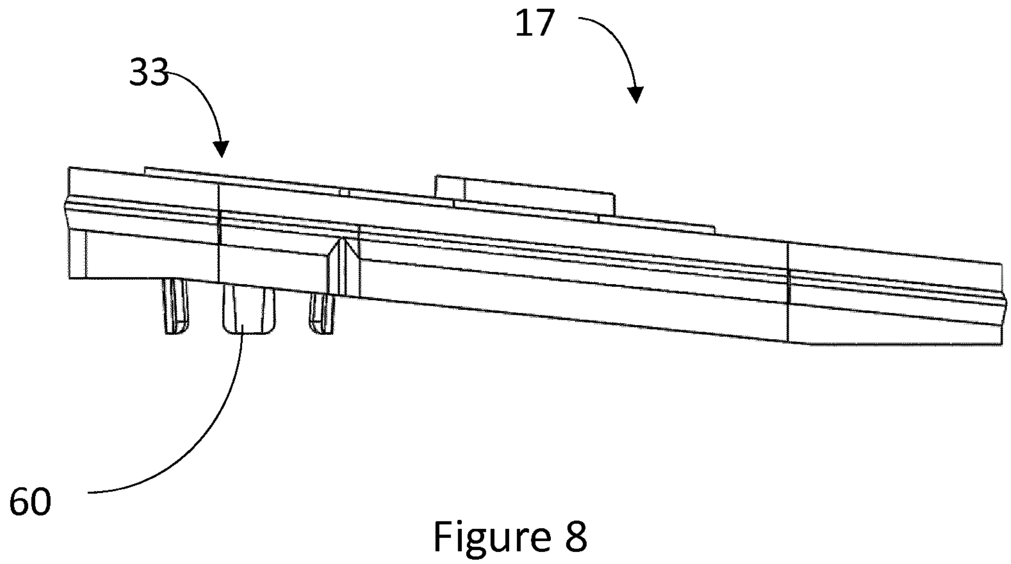
FIG. 8 shows a side view of a top panel of the apparatus of FIG. 7.

As mentioned above, the ridges 60 project radially into the opening 20 but, as best appreciated from FIG. 8, they also extend from the top panel 17 into the housing 9. The projection of the ridges 60 are angled towards each other, such that as the ridges 60 extend into the housing, the distance between the ridges 60 decreases. As best seen in FIG. 3, the projection of the ridges 60 into the housing enables the collar 35 to connect to the chamber 35 by means of the ridges 60 extending through the first open end 35*b* of the chamber 35 and engaging an inner wall of the chamber 35.

Referring again particularly to FIG. 2, in one example, the consumable article 21 is in the form of a cylindrical rod which has or contains smokable material 21*a* at a rear end in a section of the consumable article 21 that is within the heating arrangement 23 when the consumable article 21 is inserted in the apparatus 1. A front end of the consumable article 21 extends from the apparatus 1 and acts as a mouthpiece assembly 21*b* which includes one or more of a filter for filtering aerosol and/or a cooling element 21*c* for cooling aerosol. The filter/cooling element 21*c* is spaced from the smokable material 21*a* by a space 21*d* and is also spaced from the tip of mouthpiece assembly 21*b* by a further space 21*e*. The consumable article 21 is circumferentially wrapped in an outer layer (not shown). In one example, the outer layer of the consumable article 21 is permeable to allow some heated volatilised components from the smokable material to escape the consumable article 21.

In operation, the heater arrangement 23 will heat the consumable article 21 to volatilise at least one component of the smokable material 21*a*.

The primary flow path for the heated volatilised components from the smokable material 21*a* is axially through the consumable article 21, through the space 21*d*, the filter/cooling element 21*c* and the further space 21*e* before entering a user's mouth through the open end of the mouthpiece assembly 21*b*. However, some of the volatilised components may escape from the consumable article 21 through its permeable outer wrapper and into the space 36 surrounding the consumable article 21 in the chamber 35.

It would be undesirable for the volatilised components that flow from the consumable article 21 into the chamber 35 to be inhaled by the user, because these components would not pass through the filter/cooling element 21*c* and thus be unfiltered and not cooled.

Advantageously, the volume of air surrounding the consumable article 21 in the chamber 35 and the fin-cooled interior wall of the chamber 35 causes at least some of the volatilised components that escape the consumable article 21 through its outer layer to cool and condense on the interior wall of the chamber 35 preventing those volatilised components from being possibly inhaled by a user.

This cooling effect may be assisted by cool air that is able to enter from outside the apparatus 1 into the space 36 surrounding the consumable article 21 in the chamber 35 via the ventilation paths 61, which allows fluid to flow into and out of the apparatus. A ventilation path 61 will be defined between a pair of the plurality of neighbouring ridges 60 to provide ventilation around the outside of the consumable article 21 at the insertion point.

In one example, a second ventilation path 61 is provided between a second pair of neighbouring ridges for at least one heated volatilised components to flow from the consumable article 21 at a second location. Therefore ventilation is provided around the outside of the consumable article 21 at the insertion point by the first and second ventilation paths 61.

Furthermore, heated volatilised components that escape the consumable article 21 through its outer wrapper do not condense on the internal wall of the chamber 35 and are able to flow safely out of the apparatus 1 via the ventilation paths 61 without being inhaled by a user.

The chamber 35 and the ventilation both aid in reducing the temperature and the content of water vapour composition released in heated volatilised components from the smokable material.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A system for heating smokable material to volatilize at least one component of the smokable material comprising an apparatus arranged to heat smokable material and a consumable article containing smokable material, the apparatus comprising:

a housing, the housing having a first opening at a first end through which a consumable article containing smokable material can be removably inserted into the apparatus;

at least one heater arrangement arranged within the housing for heating smokable material within the consumable article when in use; and a hollow chamber between the first opening and the at least one heater arrangement, the hollow chamber comprising an interior wall with a radially inner surface and a radially outer surface opposed to the radially inner surface, the radially inner surface surrounding at least a portion of the consumable article and the outer surface positioned interior to the housing, wherein the radially inner surface of the interior wall and the at least a portion of the consumable article define one or more ventilation pathways there between, the one or more ventilation pathways extending from the first opening to the heater arrangement, the one or more ventilation pathways being radially between the radially inner surface of the interior wall and an exterior surface of the consumable article for the one or more ventilation pathways extending from the first opening to the heater arrangement, the one or more ventilation pathways being delimited by the exterior surface of the consumable article for the entire length of the one or more ventilation pathways extending from the first opening to the heater arrangement, wherein, when the apparatus is in use, the one or more ventilation pathways allow air to flow in to the apparatus and along the exterior surface of the consumable article and the radially inner surface of the interior wall, the one or more ventilation pathways allowing air to contact the exterior surface of the consumable article along the entire length of the one or more ventilation pathways extending from the first opening to the heater arrangement, and wherein the hollow chamber comprises one or more fins on the radially outer surface of the interior wall.

2. The system of claim 1, wherein the hollow chamber comprises a first open end and wherein the hollow chamber is arranged so that the first open end is positioned towards the first opening of the apparatus.

3. The system of claim 2, wherein the hollow chamber comprises a second open end and wherein the hollow chamber is arranged so that the second open end is positioned towards the heating arrangement.

4. The system of claim 3, wherein the heating arrangement comprises a heating tube and wherein the second open end of the hollow chamber engages with an end of the heating tube.

5. The system of claim 4, wherein the hollow chamber comprises one or more engagement formations for engaging with the heating tube.

6. The system of claim 1, wherein the apparatus comprises a collar defining or surrounding the first opening, wherein the collar comprises a plurality of ridges arranged circumferentially around the first opening and which project into the first opening, and wherein at least one of the one or more ventilation pathways is defined by a first neighboring pair of the plurality of ridges.

7. The system of claim 6, wherein the plurality of ridges are configured to engage with the consumable article received within the apparatus in use.

8. The system of claim 6, wherein the collar comprises one or more engagement elements for engaging with the hollow chamber.

9. The system of claim 8, wherein the plurality of ridges extend into the housing, and the engagement elements are the plurality of ridges.

10. The system of claim 1, wherein the hollow chamber comprises a gripping section arranged to grip the consumable article when the consumable article is inserted in the system, and wherein the gripping section is arranged on the inner surface and defines the one or more ventilation pathways between the gripping section and the exterior surface of the consumable article.

11. The system of claim 10, wherein the gripping section compresses the consumable article in a region or regions of the consumable article that are contacted by the gripping section.

12. The system of claim 10, wherein the gripping section comprises a plurality of lobes spaced apart circumferentially around an inner surface of the hollow chamber, each lobe contacting the consumable article so that the consumable article is gripped between the pluralities of lobes.

13. The system of claim 10 wherein the gripping section defines an oval aperture in the hollow chamber and wherein the gripping section compresses a region of the consumable that is in the oval aperture into an oval shape.

14. An apparatus arranged to heat smokable material to volatilize at least one component of the smokable material, the apparatus comprising:

a housing, the housing having a longitudinal axis and a first opening at a first end through which a consumable article containing smokable material can be removably inserted into the apparatus;

at least one heater arrangement arranged within the housing for heating smokable material within the consumable article when in use;

a collar defining or surrounding the first opening; and a hollow chamber axially between the collar and the at least one heater arrangement, the hollow chamber surrounding a portion of the consumable article when the consumable article is inserted into the apparatus, the hollow chamber comprising a gripping section arranged to releasably grip a part of the portion of the consumable article when the consumable article is removably inserted in the apparatus, wherein the gripping section comprises a plurality of lobes spaced apart circumferentially around an inner surface of the hollow chamber, each lobe extending radially inwardly from the inner surface and contacting the consumable article so that the consumable article is gripped radially between the plurality of lobes when the consumable article is removably inserted in the apparatus, the plurality of lobes at least partially compressing the consumable article in regions of the consumable article that are contacted by the plurality of lobes when the consumable article is removably inserted in the apparatus.

15. The apparatus of claim 14, wherein the gripping section is configured to compress the consumable article in a region or regions of the consumable article that are contacted by the gripping section, in use.

16. The apparatus of claim 14 wherein the gripping section defines an oval aperture in the hollow chamber and wherein the gripping section compresses the region of the consumable that is in the oval aperture into an oval shape, in use.

17. The system according to claim 1, wherein, when the apparatus is in use, air is configured to flow in through the one or more ventilation pathways along the inner surface of the hollow chamber and out through the consumable article or the one or more ventilation pathways along the inner surface of the hollow chamber.

18. The system according to claim 1, wherein the one or more fins are configured to cool an unfiltered portion of the at least one component of the smokable material that escapes the consumable article following volatilization.

19. An arranged to heat smokable material to volatilize at least one component of the smokable material, the apparatus comprising:

a housing having a first opening at a first end through which a consumable article containing smokable material can be removably inserted into the apparatus;

a collar defining or surrounding the first opening, wherein the collar comprises a plurality of ridges arranged circumferentially around the first opening and which project into the first opening;

at least one heater arrangement arranged within the housing for heating smokable material within the consumable article when in use;

a hollow chamber positioned between the first opening and the at least one heater arrangement, the hollow chamber surrounding at least a portion of the consumable article when the consumable article is inserted into the apparatus, wherein an inner wall of the hollow chamber and the at least a portion of the consumable article define an air gap there between, wherein the hollow chamber comprises a first open end and a second open end, and wherein the hollow chamber is arranged so that the first open end is positioned towards the first opening of the apparatus and the second open end is positioned towards the heater arrangement;

control circuitry configured and arranged to control the heating of the smokable material in the consumable article; and a power source comprising a battery, wherein the battery is electrically coupled to the heater arrangement to supply electrical power when required and under control of the control circuitry to heat the smokable material in the consumable article to volatize the smokable material without causing the smokable material to burn;

wherein, when the apparatus is in use, the apparatus comprises a ventilation pathway defined by a first neighboring pair of the plurality of ridges that allows air to flow into the air gap between the consumable article and the hollow chamber and/or hot vapors that have escaped from the consumable article to flow out of the apparatus;

wherein the at least one heater arrangement comprises a heating tube and the second open end of the hollow chamber positioned between the first opening and the at least one heater arrangement engages with an end of the heating tube.

20. An apparatus arranged to heat but not burn smokable material to volatilize at least one component of the smokable material, the apparatus comprising:

a housing having a first opening at a first end through which a consumable article containing smokable material can be removably inserted into the apparatus;

a collar defining or surrounding the first opening, wherein the collar comprises a plurality of ridges arranged circumferentially around the first opening and which project into the first opening, wherein a ventilation pathway is defined by a first neighboring pair of the plurality of ridges;

at least one heating arrangement arranged within the housing for heating smokable material within the consumable article when in use;

a hollow chamber positioned between the first opening and the at least one heating arrangement and surrounding at least a portion of the consumable article when the consumable article is inserted into the apparatus, wherein an inner wall of the hollow chamber and the at least a portion of the consumable article define an air gap therebetween;

wherein the hollow chamber comprises a first open end and wherein the hollow chamber is arranged so that the first open end is positioned towards the first opening of the apparatus, wherein the hollow chamber comprises a second open end and wherein the hollow chamber is arranged so that the second open end is positioned towards the heating arrangement, wherein the first open end connects to and is supported by the collar;

control circuitry configured and arranged to control the heating of the smokable material in the consumable article; and a power source comprising a battery, wherein the battery is electrically coupled to the heating arrangement to supply electrical power when required and under control of the control circuitry to heat the smokable material in the consumable article to volatize the smokable material without causing the smokable material to burn;

wherein the hollow chamber comprises a gripping section arranged to grip the consumable article when the consumable article is inserted in the apparatus, the gripping section comprising a plurality of ridges spaced apart circumferentially around an inner surface of the hollow chamber, each of the plurality of ridges arranged for contacting the consumable article so that the consumable article is gripped between the plurality of ridges.

21. The system of claim 1, wherein, when in use, the hollow chamber comprises a volume of air surrounding the consumable article and the one or more fins are arranged to cool the interior wall, wherein the volume of air surrounding the consumable article in the hollow chamber and the fin-cooled interior wall of the chamber causes at least some of the volatilized components that escape the consumable article through an outer layer of the consumable article to cool and condense on the interior wall of the hollow chamber, preventing the at least some of the volatilized components from being inhaled by a user.

* * * * *